(12) United States Patent
Planche et al.

(10) Patent No.: US 9,505,414 B2
(45) Date of Patent: Nov. 29, 2016

(54) DEVICE AND METHOD FOR ESTIMATING THE CHARGE OF A MOTOR VEHICLE

(71) Applicant: RENAULT s.a.s., Boulogne-Billancourt (FR)

(72) Inventors: Gregory Planche, Orsay (FR); Benoit Verbeke, Savigny-sur-Orge (FR); Kamal Zaoui, Rambouillet (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/427,385

(22) PCT Filed: Jun. 26, 2013

(86) PCT No.: PCT/FR2013/051482
§ 371 (c)(1),
(2) Date: Mar. 11, 2015

(87) PCT Pub. No.: WO2014/041263
PCT Pub. Date: Mar. 20, 2014

(65) Prior Publication Data
US 2015/0224996 A1    Aug. 13, 2015

(30) Foreign Application Priority Data
Sep. 11, 2012    (FR) ...................................... 12 58520

(51) Int. Cl.
*F16H 59/48*    (2006.01)
*B60W 40/13*    (2012.01)
(Continued)

(52) U.S. Cl.
CPC ............ *B60W 40/13* (2013.01); *B60W 40/076* (2013.01); *F16H 59/48* (2013.01); *F16H 59/52* (2013.01);
(Continued)

(58) Field of Classification Search
CPC ............ B60W 40/13; B60W 40/076; B60W 2520/105; B60W 2530/16; B60W 2520/30; F16H 61/0202; F16H 59/48; F16H 2061/093; F16H 2059/663; F16H 2059/142

USPC .......................................................... 701/65
See application file for complete search history.

(56) References Cited

U.S. PATENT DOCUMENTS 6,330,504 B1 * 12/2001 Toukura .............. B60W 30/188
                                                          477/107
6,882,919 B2 *  4/2005 Lee ...................... F16H 61/0213
                                                          701/57
(Continued)

FOREIGN PATENT DOCUMENTS

JP          EP 1034961 A2 *  9/2000  ............ B60W 10/06
WO          2006 033612      3/2006

OTHER PUBLICATIONS

International Search Report Issued Aug. 30, 2013 in PCT/FR13/051482 Filed Jun. 26, 2013.
(Continued)

*Primary Examiner* — Roger Pang
(74) *Attorney, Agent, or Firm* — Oblon, McClelland, Maier & Neustadt, L.L.P.

(57) ABSTRACT

A device and method for estimating the charge of a motor vehicle. A device for estimating the charge of a combustion or hybrid powered motor vehicle comprising an automatic transmission, comprising a module for determining the charging of the vehicle capable of determining if the vehicle is charged and an activation module for activating a program for controlling the automatic transmission on the basis of the determination of the charging of the vehicle. The module for determining the charging comprises a first unit for estimating a first slope value on the basis of the acceleration of the vehicle derived from the driving force and the longitudinal acceleration of the vehicle, a second unit for estimating a second slope value on the basis of the moment of inertia applied to a non-driving wheel of the vehicle and the engine and resistant torques and a third unit for determining the charging of the vehicle on the basis of the first and second slope values.

15 Claims, 2 Drawing Sheets

Figure 1:
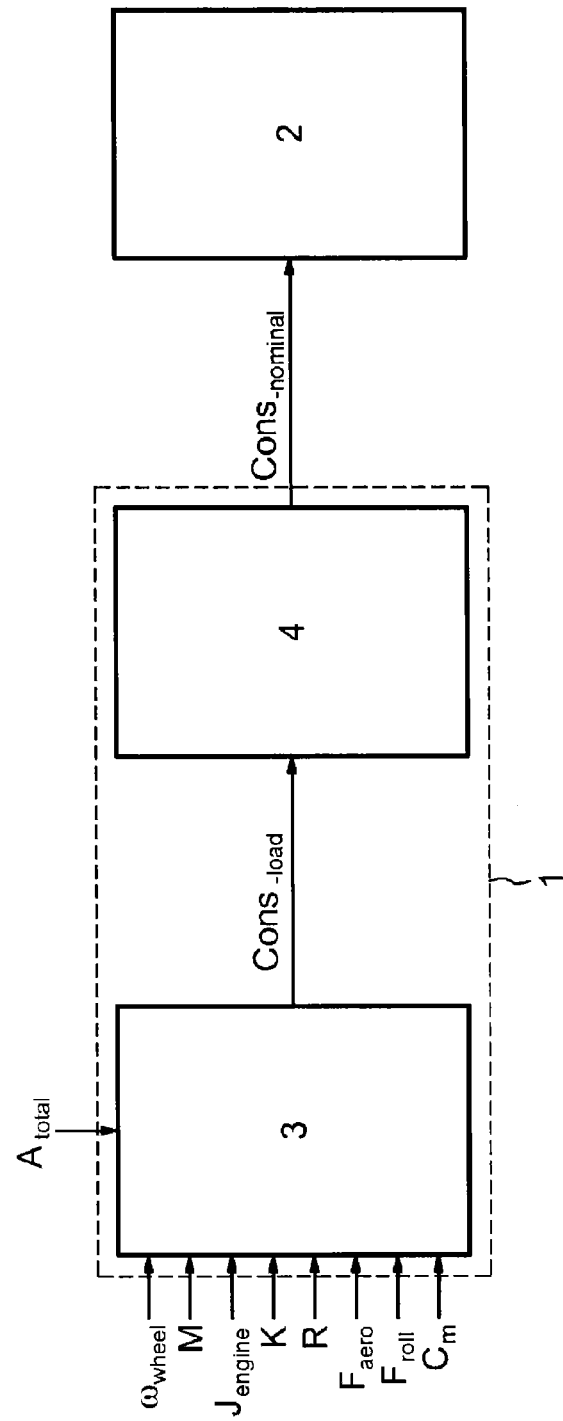

(51) Int. Cl.
  *G01G 19/08* (2006.01)
  *B60W 40/076* (2012.01)
  *F16H 59/52* (2006.01)
  *F16H 61/02* (2006.01)
  *G01L 1/26* (2006.01)
  *F16H 59/14* (2006.01)
  *F16H 59/66* (2006.01)
  *F16H 61/00* (2006.01)

(52) U.S. Cl.
  CPC ........ *F16H 61/0202* (2013.01); *G01G 19/086* (2013.01); *G01L 1/26* (2013.01); *B60W 2520/105* (2013.01); *B60W 2520/30* (2013.01); *B60W 2530/16* (2013.01); *F16H 2059/142* (2013.01); *F16H 2059/663* (2013.01); *F16H 2061/0093* (2013.01)

(56) References Cited

U.S. PATENT DOCUMENTS

| | | | | |
|---|---|---|---|---|
| 7,340,335 | B2* | 3/2008 | Kitaori | B60W 10/06 303/183 |
| 7,536,272 | B2* | 5/2009 | Leminoux | G01G 19/086 701/124 |
| 2014/0067211 | A1* | 3/2014 | Kim | B60W 30/143 701/54 |
| 2014/0172252 | A1* | 6/2014 | Siegel | F16H 61/00 701/55 |

OTHER PUBLICATIONS

French Search Report Issued May 8, 2013 in Application No. FR1258520 Filed Sep. 11, 2012.

\* cited by examiner

DEVICE AND METHOD FOR ESTIMATING THE CHARGE OF A MOTOR VEHICLE

The present invention relates to a device and a method for estimating the load of a combustion or hybrid powered motor vehicle.

The knowledge of the load of a motor vehicle is necessary for the correct functioning of numerous devices installed in the vehicle, in particular such as braking management devices or automatic gearbox management devices.

Devices exist for estimating the mass of a motor vehicle.

Reference can be made in this respect to document FR 2 857 090, which describes a method for estimating mass based on a recursive least squares algorithm. However, such an estimation method does not make it possible to estimate quickly the mass of the motor vehicle.

Reference can also be made to document EP 1 298 020, which describes a method for determining the mass of a motor vehicle whilst taking into account different driving situations. However, such a method does not make it possible to estimate the mass of the vehicle when the vehicle is at standstill.

In addition, in today's vehicles, the user must press on a control button when the vehicle is loaded. The control button will then activate a program for controlling the computer of the automatic transmission suitable for a loaded or unloaded vehicle, the latter state being referred to by the term "nominal". However, the installation of such a control button is relatively costly.

The object of the present invention is therefore to overcome these disadvantages.

The object of the invention is therefore to provide a device and a method making it possible to quickly obtain information concerning the loading of the motor vehicle, even when the vehicle is at standstill, without the need for a user of the vehicle to press on a control button.

The object of the invention is to control the computer of an automatic transmission on the basis of the loading state of the motor vehicle so as to best optimize the operation of the powertrain.

The invention relates to any type of engine, whether combustion or hybrid powered.

In one embodiment the invention relates to a device for estimating the load of a combustion or hybrid powered motor vehicle comprising an automatic transmission, comprising a module for determining the loading of the vehicle capable of determining if the vehicle is loaded, and a module for activating a program for controlling the automatic transmission on the basis of the determination of the loading of the vehicle.

The module for determining the loading comprises a first unit for estimating a first slope value on the basis of the acceleration of the vehicle derived from the driving means and the longitudinal acceleration of the vehicle, a second unit for estimating a second slope value on the basis of the moment of inertia applied to a non-driving wheel of the vehicle and the engine and resistant torques, and a third unit for determining the loading of the vehicle on the basis of the first and second slope values.

Thus, information concerning the loading of the motor vehicle is obtained quickly and economically, even when the vehicle is at standstill, without having to press on a control button.

The first unit for estimating a first slope value advantageously comprises a module for calculating the acceleration of the vehicle derived from the driving means corresponding to the derivative of the speed of rotation of the wheels as a function of time.

The first unit for estimating a first slope value may comprise a comparator capable of calculating the first slope value on the basis of the derivative of the speed of rotation of the wheels as a function of time and the longitudinal acceleration of the vehicle.

The second unit for estimating a second slope value advantageously comprises a module for determining the moment of inertia on the basis of the mass of the vehicle, the inertia of the engine, the reduction ratio between the output and the input of the engine, and the radius of the wheel, and also a module for multiplying the moment of inertia with the derivative of the speed of rotation of the wheel as a function of time.

The second unit for estimating a second slope value may comprise a module for calculating the resistant torque on the basis of the radius of the wheel, the aerodynamic force and the rolling force.

The third unit advantageously comprises an estimation unit receiving at the input the first and second slope values and capable of determining a load value.

For example, the third unit comprises a means for comparing the load value with a threshold value and capable of determining the loading of the vehicle and of transmitting a setpoint of the loaded or unloaded state to the module for activating the control of the computer of the automatic transmission in loaded mode or in nominal mode.

The longitudinal acceleration of the vehicle is determined for example by an accelerometer.

In accordance with a second aspect the invention relates to a method for estimating the load of a combustion or hybrid powered motor vehicle comprising an automatic transmission, wherein it is determined if the vehicle is loaded and a program for controlling the automatic transmission on the basis of the determination of the loading of the vehicle is activated.

A first slope value is estimated on the basis of the acceleration of the vehicle derived from the driving means and the longitudinal acceleration of the vehicle, a second slope value is estimated on the basis of the moment of inertia applied to a non-driving wheel of the vehicle and the engine and resistant torques, and the loading of the vehicle is determined on the basis of the first and second slope values.

The acceleration of the vehicle derived from the driving means is advantageously calculated by deriving the speed of rotation of the wheels as a function of time, and the derivative of the speed of rotation of the wheels as a function of time is compared with the longitudinal acceleration of the vehicle.

For example, the moment of inertia is determined on the basis of the mass of the vehicle, the inertia of the engine, the reduction ratio between the output and the input of the engine, and the radius of the wheel, a module for multiplying the moment of inertia with the derivative of the speed of rotation of the wheel as a function of time is provided, and the resistant torque is calculated on the basis of the radius of the wheel, the aerodynamic force and the rolling force.

A load value is determined on the basis of the first and second slope values.

In addition, the load value can be compared with a threshold value, and the loading of the vehicle is determined.

Further objectives, features and advantages of the invention will become clear upon reading the following description, which is given merely by way of non-limiting example and with reference to the accompanying drawings, in which:

FIG. 1 schematically shows the device for estimating the load of a vehicle; and

Figure 2:
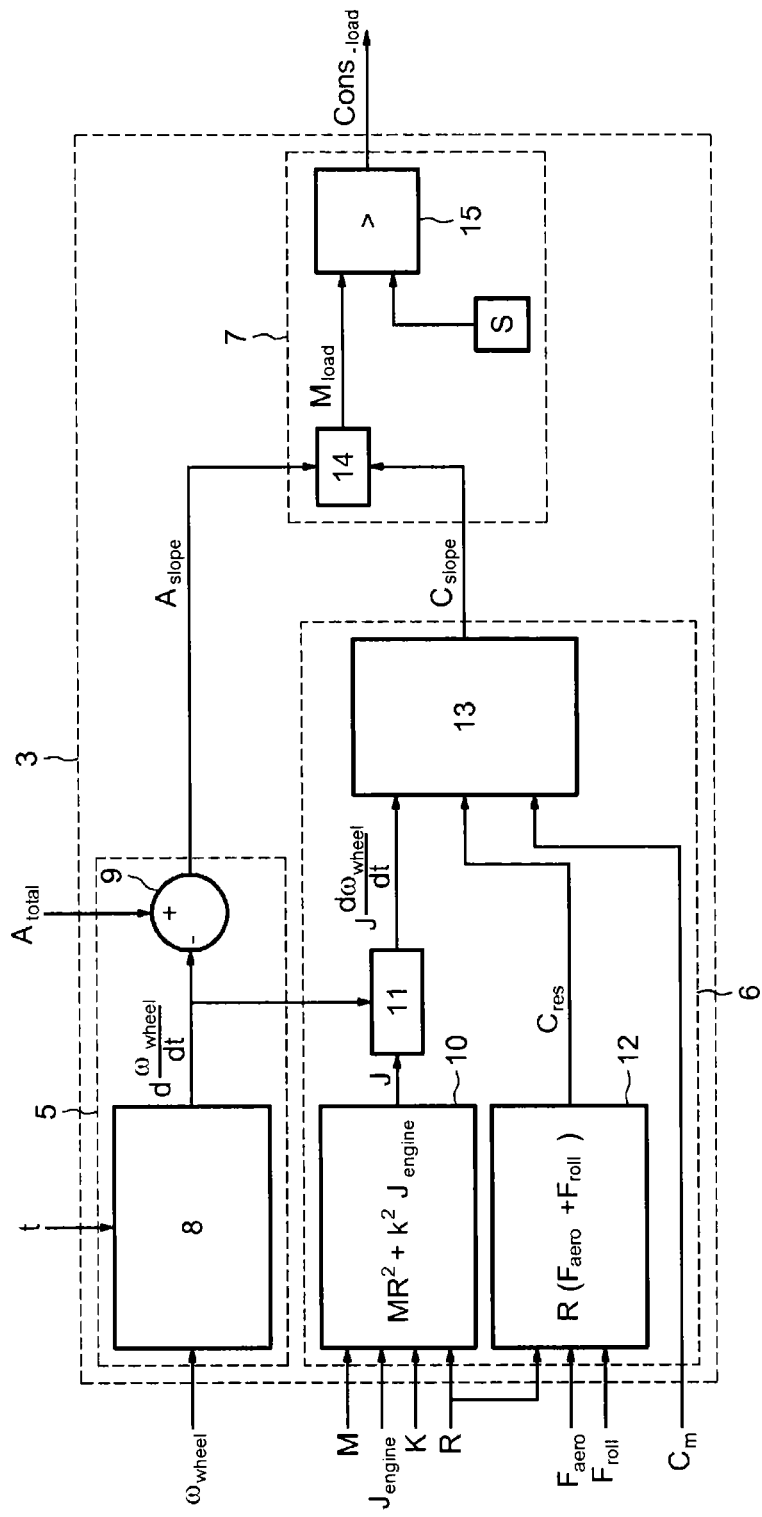

FIG. 2 illustrates the module for determining the loading of the vehicle according to FIG. 1.

The device for estimating the load of a motor vehicle according to FIG. 1 comprises an electronic control unit 1 intended to control the computer 2 of the automatic transmission (not shown) of the motor vehicle.

The control unit 1 comprises a module for determining 3 the loading of the vehicle, said module being capable of determining if the vehicle is loaded and of sending a setpoint signal of the loading Cons_$_{load}$ to a module for activating 4 the program for controlling the computer 2 on the basis of the loading of the vehicle. The computer 2 of the automatic transmission is controlled by default in loaded mode. When the module for determining 3 the loading of the vehicle determines that the vehicle is not loaded, the module for activating the control 4 activates the nominal control mode by sending a nominal mode control setpoint Cons_$_{nominal}$ to the computer 2.

The module for determining 3 the loading of the vehicle, illustrated in detail in FIG. 2, receives at the input the speed of rotation of the wheel $\omega_{wheel}$, the longitudinal acceleration of the vehicle $A_{total}$, the mass of the motor vehicle m, the inertia of the engine $J_{engine}$, the reduction ratio between the output and the input of the engine K, the radius of the wheel R, the aerodynamic force $F_{aero}$, the rolling force $F_{roll}$, and the engine torque $C_m$.

The module for determining 3 the loading of the vehicle comprises a first unit 5 for estimating a first value of the slope of the road $A_{slope}$, a second unit 6 for estimating a second value of the slope of the road $C_{slope}$, and a unit 7 for determining the loading setpoint signal Cons_$_{load}$.

The first unit 5 for estimating a first value of the slope of the road $A_{slope}$ receives at the input an acceleration value $A_{total}$ derived from an accelerometer (not shown) measuring the longitudinal acceleration of the motor vehicle and a value of the speed of rotation of the non-driving wheels $\omega_{wheel}$ of the motor vehicle as a function of time measured by sensors (not shown).

The sensors measuring the speed of rotation of the wheels are, for example, the sensors used for the implementation of an anti-lock brake system (ABS) of the vehicle.

The accelerometer measures the longitudinal or total acceleration $A_{total}$ corresponding to the sum of the acceleration caused by the slope $A_{slope}$ of the road and the acceleration associated with the engine of the vehicle $A_{engine}$. Thus, at standstill on a horizontal wheel, the value measured by the accelerometer is zero.

The electronic control unit 1 receives the information transmitted by the different sensors and transmits this information to the first unit 5.

The first unit 5 comprises a module 8 for calculating the derivative in relation to the time of the signal representative of the speed of rotation of the wheels $\omega_{wheel}$ as a function of time t, which is equal to the acceleration associated with the engine of the vehicle:

$$\frac{d\omega_{wheel}}{dt} = A_{engine}$$

The first unit 5 comprises a comparator 9 which compares the longitudinal acceleration $A_{total}$ and the acceleration associated with the engine of the vehicle $A_{engine}$ and determines the resultant acceleration $A_{slope}$ of the vehicle associated with the slope of the road:

$$A_{slope} = A_{total} - A_{engine}$$

The inclination α of the road at the moment t can be determined on the basis of the resultant acceleration $A_{slope}$ in accordance with the fundamental principle of dynamics:

$$m \cdot A\text{slope} = m \cdot g \cdot \sin(\alpha): \quad \text{equation (1)}$$

from which:

$$\alpha = \arcsin(A\text{slope}/g)$$

where g is the constant of Earth's gravitational acceleration, equal to approximately 9.81 m/s² and where the function arcsin denotes the inverse sine function. The inclination of the road α is expressed here in angular degrees and can be expressed as a percentage of the road in accordance with the following equation: P=100·tan(α)=100·tan(arcsin($A_{slope}$/g)), where tan denotes the tangent function.

The second unit 6 for estimating a second value of the slope of the road $C_{slope}$ comprises a module for determining 10 the moment of inertia J of the wheel on the basis of the mass of the motor vehicle m, the inertia of the engine $J_{engine}$, the reduction ratio between the output and the input of the engine K, and the radius of the wheel R, a module for multiplying 11 the moment of inertia J with the derivative of the speed of rotation of the wheel $\omega_{wheel}$ determined by the derivation module 8, a module for calculating 12 the resistant torque $C_{res}$ on the basis of the radius of the wheel R, the aerodynamic force $F_{aero}$ and the rolling force $F_{roll}$, and a module for determining 13 a torque $C_{slope}$ associated with the force of the gradient of the road.

The equation of the balance of the torques at one of the non-driving wheels is determined by the application of the fundamental law of dynamics in accordance with the following equation:

$$J\frac{d\omega_{wheel}}{dt} = C_m - C_{res} - C_{slope}$$

With:
J, the inertia of the wheel, expressed in kg·m²;

$$\frac{d\omega_{wheel}}{dt},$$

the acceleration of the wheel, expressed in rad·s⁻²;
$C_m$, the engine torque, expressed in N·m;
$C_{res}$, the resistant torque, expressed in N·m, and
$C_{slope}$, the torque associated with the gradient of the road, expressed in N·m.

The inertia of the wheel J derived from the module for determining 10 the moment of inertia J is equal to:

$$J = J_{vehicle} + K^2 \cdot J_{engine}, \text{expressed in kg·m}^2$$

With:
$J_{vehicle} = m \cdot R^2$, the inertia of the motor vehicle, M, the mass of the motor vehicle, expressed in kg, and R the radius of the wheel, expressed in m;
K, the reduction ratio between the output and the input of the engine wheel, which is a mechanical constant;
$J_{engine}$, the inertia of the engine, which is a mechanical constant, expressed in kg·m².

The resistant torque $C_{res}$ calculated by the calculation module 12 corresponds to the sum of the resistant forces applied on the wheel:

$$C_{res} = R \cdot (F_{aero} + F_{roll})$$

With:
R the radius of the wheel, expressed in m;
$F_{aero}$, the aerodynamic force experienced by the vehicle, expressed in N;

$$F_{aero} = \frac{1}{2} \cdot \rho \cdot S \cdot C_x \cdot V^2,$$

where $\rho$ is the bulk density of the air, S is the reference surface of the vehicle, $C_x$ is the aerodynamic coefficient of the vehicle, and V is the speed of the vehicle.
$F_{roll}$, the resistive force to wheel-on-road contact, expressed in N, determined with the aid of a mapping on the basis of the speed of the vehicle.
$F_{aero}$ corresponds to the following equation:
The slope torque $C_{slope}$ is thus obtained by the determination module 13:

$$C_{slope} = J \frac{d\omega_{wheel}}{dt} - C_m + C_{res} = \qquad \text{equation (2)}$$

$$(m \cdot R^2 + K^2 \cdot J_{engine}) \frac{d\omega_{wheel}}{dt} - C_m + R \cdot (F_{aero} + F_{roll}):$$

With:
$J_{vehicle} = m \cdot R^2$, the inertia of the motor vehicle, m, the mass of the motor vehicle, expressed in kg, and R the radius of the wheel, expressed in m;
K, the reduction ratio between the output and the input of the engine wheel, which is a mechanical constant;
$J_{engine}$, the inertia of the engine, which is a mechanical constant, expressed in kg·m².

The unit 7 for determining the setpoint signal of the loading Cons_load comprises an estimation unit 14 receiving at the input the value of the resultant acceleration $A_{slope}$ estimated by the first unit 5 and the value of the slope torque $C_{slope}$ estimated by the second unit 6.

The slope torque $C_{slope}$ is then also equal to:

$$C_{slope} = m \cdot R \cdot g \cdot \sin(\alpha): \qquad \text{equation (3)}$$

With:
m, the mass of the vehicle, expressed in kg;
R, the radius of the wheel, expressed in m;
g, the coefficient of gravity, equal to 9.81 m/s²;
$\alpha$, the slope of the road, expressed in degrees.

In accordance with equations (1) and (3):

$$m \cdot R \cdot A_{slope} = m \cdot R \cdot g \cdot \sin(\alpha) = C_{slope}$$

Thus, in accordance with equation (2), $$m \cdot R \cdot A_{slope} = (m \cdot R^2 + K^2 J_{engine}) \frac{d\omega_{wheel}}{dt} C_m + R \cdot (F_{aero} + F_{roll})$$

From which the mass m of the vehicle can be deduced:

$$m = \frac{K^2 \cdot J_{engine} \frac{d\omega_{wheel}}{dt}) - C_m + R \cdot (F_{aero} + F_{roll})}{R \left( A_{slope} - R \cdot \frac{d\omega_{wheel}}{dt} \right)}$$

The estimation unit 14 thus determines a load value $M\_{load}$, expressed in kg, corresponding to the difference between the mass of the vehicle m and the mass $M\_{empty}$ of the empty vehicle, known beforehand.

$$M\_{load} = m - M\_{empty}.$$

The load value $M\_{load}$ is then compared in a comparator 15 with a threshold value S.

When the load value $M\_{load}$ exceeds the threshold value S, the unit 7 determines a setpoint signal of the loading Cons_load and transmits this to the module for activating 4 the control program in loaded mode. When the load value $M\_{load}$ is below the threshold value S, the unit 7 determines a setpoint signal of the loading Cons_load and transmits this to the module for activating the control program in nominal mode, i.e. in unloaded mode.

Thus, even if the vehicle is at standstill, the computer of the automatic transmission is controlled in loaded mode.

The invention claimed is:

1. A device for estimating a load of a combustion or hybrid powered motor vehicle, comprising an automatic transmission, comprising:
    a module for determining loading of the vehicle capable of determining if the vehicle is loaded, and
    a module for activating a program for controlling the automatic transmission on the basis of the determination of the loading of the vehicle,
    wherein the module for determining the loading comprises a first unit for estimating a first slope value on the basis of an acceleration of the vehicle and a longitudinal acceleration of the vehicle, a second unit for estimating a second slope value on the basis of a moment of inertia applied to a non-driving wheel of the vehicle and engine and resistant torques, and a third unit for determining the loading of the vehicle on the basis of the first and second slope values.

2. The device as claimed in claim 1, wherein the first unit for estimating the first slope value comprises a module for calculating the acceleration of the vehicle corresponding to a derivative of the speed of rotation of the wheels as a function of time.

3. The device as claimed in claim 2, wherein the first unit for estimating the first slope value comprises a comparator capable of calculating the first slope value on the basis of the derivative of the speed of rotation of the wheels as a function of time and the longitudinal acceleration of the vehicle.

4. The device as claimed in claim 2, wherein the second unit for estimating the second slope value comprises a module for determining the moment of inertia on the basis of a mass of the vehicle, an inertia of the engine, a reduction ratio between the output and the input of the engine, and a radius of the wheel, and also a module for multiplying the moment of inertia with the derivative of the speed of rotation of the wheel as a function of time.

5. The device as claimed in claim 4, wherein the second unit for estimating the second slope value comprises a module for calculating the resistant torque on the basis of the radius of the wheel, an aerodynamic force and a rolling force.

6. The device as claimed in claim 1, wherein the third unit comprises an estimation unit receiving at an input the first and second slope values and capable of determining a load value.

7. The device as claimed in claim 6, wherein the third unit comprises a means for comparing the load value with a threshold value and capable of determining the loading of the vehicle.

8. The device as claimed in claim 1, wherein the longitudinal acceleration of the vehicle is determined by an accelerometer.

9. The device as claimed in claim 1, wherein:
the third unit determines a load value, and compares the load value with a threshold value,
when the load value is greater than the threshold value, the program is activated in loaded mode, and
when the load value is less than the threshold value, the program is activated in unloaded mode.

10. A method for estimating a load of a combustion or hybrid powered motor vehicle comprising an automatic transmission, comprising:
determining if the vehicle is loaded,
activating a program for controlling the automatic transmission on the basis of the determination of loading of the vehicle,
estimating a first slope value on the basis of an acceleration of the vehicle and a longitudinal acceleration of the vehicle,
estimating a second slope value on the basis of a moment of inertia applied to a non-driving wheel of the vehicle and engine and resistant torques, and
determining the loading of the vehicle on the basis of the first and second slope values.

11. The method as claimed in claim 10, wherein the acceleration of the vehicle is derived from a speed of rotation of the wheels and is calculated as a function of time, and the derivative of the speed of rotation of the wheels as a function of time is compared with the longitudinal acceleration of the vehicle.

12. The method as claimed in claim 10, wherein the moment of inertia is determined on the basis of a mass of the vehicle, an inertia of the engine, a reduction ratio between the output and the input of the engine, and a radius of the wheel, a module for multiplying the moment of inertia with the derivative of the speed of rotation of the wheel as a function of time is provided, and the resistant torque is calculated on the basis of the radius of the wheel, an aerodynamic force and a rolling force.

13. The method as claimed in claim 10, wherein a load value is determined on the basis of the first and second slope values.

14. The method as claimed in claim 13, wherein the load value is compared with a threshold value, and the loading of the vehicle is determined.

15. The method as claimed in claim 14, wherein:
when the load value is greater than the threshold value, the program is activated in loaded mode, and
when the load value is less than the threshold value, the program is activated in unloaded mode.

* * * * *